United States Patent
Siddappa et al.

(10) Patent No.: US 10,623,452 B2
(45) Date of Patent: Apr. 14, 2020

(54) SYSTEM AND METHOD FOR NETWORK ASSISTED MULTI-LINE REGISTRATION IN AN IMS NETWORK

(71) Applicant: HEWLETT PACKARD ENTERPRISE DEVELOPMENT LP, Houston, TX (US)

(72) Inventors: Nitheen Huligerepura Siddappa, Bangalore (IN); Frederic Huve, Grenoble (FR); Aravind Ashok Shirabur, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/013,850

(22) Filed: Jun. 20, 2018

(65) Prior Publication Data

US 2019/0312916 A1 Oct. 10, 2019

(30) Foreign Application Priority Data

Apr. 10, 2018 (IN) .............................. 201841013624

(51) Int. Cl.
*H04W 4/00* (2018.01)
*H04L 29/06* (2006.01)
*H04W 8/12* (2009.01)

(52) U.S. Cl.
CPC ........ *H04L 65/1073* (2013.01); *H04L 65/105* (2013.01); *H04L 65/1006* (2013.01); *H04L 65/1016* (2013.01); *H04W 8/12* (2013.01)

(58) Field of Classification Search
CPC .............. H04L 65/1073; H04L 65/105; H04L 65/1006; H04L 65/1016
See application file for complete search history.

(56) References Cited

U.S. PATENT DOCUMENTS 9,077,721 B2  7/2015  Przybysz et al.
2005/0131989 A1 *  6/2005  Beckmann ........ H04L 29/12188
                                                709/201

(Continued)

FOREIGN PATENT DOCUMENTS

WO   WO-2006045706 A1 *  5/2006  ......... H04L 65/1016

OTHER PUBLICATIONS

Christophe Gourraud, "IMS Service Routing: ISC for S-CSCF," Blog: The IMS Lantern, Jul. 18, 2007, pp. 1-29, Retrieved from the Internet on Feb. 21, 2018 at URL: <theimslantern.blogspot.in./2007/07/ims-service-routing-isc-for-s-cscf.html>.

*Primary Examiner* — Lan-Huong Truong
(74) *Attorney, Agent, or Firm* — Nolte Intellectual Property Law Group (57) ABSTRACT

A multi-line network registration capability for an IMS network is disclosed. Registration with a Home IMS domain is used for a user equipment (UE) device to authenticate to the IMS network infrastructure. IMS network infrastructure expects each UE to have a single identity (e.g., IMPI/IMPU pair) on the network. A multiple back to back registration (MB2B) module may optionally provide multiple identities to a single UE device. Multiple identities may be associated with a service plan provided for the IMPI/IMPU unique identifier. Infrastructure of the Home IMS domain may be used to support the multiple identities for a given UE device. Accordingly, the MB2B module may not require any additional infrastructure changes by other service providers. The MB2B module may be implemented as a software upgrade to existing infrastructure devices or may be implemented as a standalone front-end device to assist in performing registrations for a telco service provider.

16 Claims, 6 Drawing Sheets

(56) References Cited

U.S. PATENT DOCUMENTS

| | | |
|---|---|---|
| 2009/0191873 A1 | 7/2009 | Siegel et al. |
| 2010/0232402 A1 | 9/2010 | Przybysz |
| 2010/0290403 A1* | 11/2010 | Lindholm ............... H04W 8/06 370/328 |
| 2012/0166652 A1* | 6/2012 | Bouthemy .......... H04L 65/1016 709/227 |
| 2015/0181033 A1* | 6/2015 | Keller ................. H04L 65/1016 455/404.1 |
| 2017/0134444 A1* | 5/2017 | Buckley .............. H04L 65/1069 |
| 2019/0044980 A1* | 2/2019 | Russell ............... H04L 65/1016 |

* cited by examiner

SYSTEM AND METHOD FOR NETWORK ASSISTED MULTI-LINE REGISTRATION IN AN IMS NETWORK

RELATED APPLICATIONS

Not Applicable.

BACKGROUND

Today's Subscriber identity registration in Internet Protocol ("IP") Multimedia System ("IMS") using Voice over the Long-Term Evolution ("LTE", or "VoLTE") network (e.g., a 4G network) uses at least one mandatory step. For example, it is mandatory (excluding emergency call options) for every subscriber to authenticate with their subscription provider (Home Subscriber Server, or "HSS") to obtain telco communication services including voice, short message service ("SMS") (e.g., text messages), and enriched calling services as provided by their plan. Registration to an IMS network uses a subscriber identity that is typically identified by a unique IP Multimedia Private Identity ("IMPI") and IP Multimedia Public Identity ("IMPU"). The IMPI/IMPU pair is used to uniquely identify a subscriber wherever they are in the world and route their registration back to their Home IMS domain for authentication and access upon successful registration. For solutions requiring subscribers with multiple identities (in other words a set of IMPI/IMPU pairs for a particular user), it is still required that each identity (e.g., pair identifier) is registered in the IMS network. Otherwise, the infrastructure would not know how to route calls or provide other services, for example.

BRIEF DESCRIPTION OF THE DRAWINGS

For a detailed description of various examples, reference will now be made to the accompanying drawings, in which.

DETAILED DESCRIPTION

Subscriber identity registration is typically handled by a mobile client on user equipment ("UE") and is usually limited to one identity or a maximum of two identities. Today, registering a UE with multiple concurrent identities, especially more than 2, is not a typical configuration for devices on an IMS network. Furthermore, UE manufacturers (e.g., smart phone vendors) also have not necessarily designed-in support for multiple identities. In some cases, a soft client (implemented in software that runs on the smart phone) has been utilized to provide multiple endpoint capabilities (e.g., two phone numbers) for a single UE device. However, this software may be complicated and not available on all devices, in part, because differences in manufacturer devices, operating systems, and hardware lead to a wide variety of UE devices. Prior solutions typically rely on the mobile soft client approach to manage the Network Registration and de-Registration for each Line. Accordingly, these approaches incur the issues of complex processing on the device side, and less optimal network usage for the device and other infrastructure network components.

This disclosure is directed to an ability to provide multiple identities to a subscriber using a single user equipment (UE) on an IMS/VoLTE network. As mentioned above, the IMS infrastructure is built to expect single identity endpoints as in a single phone number (and sim card) for a single smart phone. By having an option to support multiple identities concurrently on a single UE additional services may be provided by a cellular service provider. For example, multiple identities may permit an individual subscriber to use several phone numbers (i.e. multiple line/ID(s)), on a single handset (e.g., mobile device such as a smart phone), while enjoying a standard set of supplementary and value-added services across all these numbers.

However, each identity in an IMS/Volte network uses an individual registration with the network to function properly. Typically, registration is handled by a mobile client (e.g., software) executing on user equipment ("UE") and is usually limited to one identity or a maximum of two identities (sometimes implemented for a device by using dual subscriber identity modules (i.e., SIM cards) in that device). Enabling registration for multiple identities on mobile client using software on that client may suffer from noticeable deficiencies such as those discussed below.

In contrast, the various embodiments this disclosure propose a solution that addresses the identity registration with network assistance. In some implementations, this may be accomplished by off-loading multi identity registration of subscriber(s) to a dedicated network component or existing network component upgraded with the disclosed MB2B module. As a result, the new or enhanced network component may provide for a multi identity registration process transparently to both user equipment and other existing network components. Thus, an improvement to the art of cellular phone network registration may be recognized, without a requirement to alter other infrastructure components.

Not altering other network components may include an ability for users that have purchased or been configured with a multi-identity plan may use that plan throughout the world even when connecting to a "visited" IMS domain. Note, no updates are required at the actual domain that connects to the UE device because the backend system at the Home Domain (that includes the HSS and MB2B capability) may provide the disclosed multi-identity registration capability.

Problems associated with a solution requiring any change to existing technology include but are not limited to: a) each UE vendor may need to agree to and implement a standard for enabling multi identity registration; b) bad user experience if user involvement was required for authentication/authorization of each identity; c) an increased security threat surface, in part, because the multiple user authentication/authorization credentials would be carried over the unified network interface ("UNI"); and d) increased memory/battery consumption on UE device to establish and maintain multiple registrations, in part, because the IMS network mandates periodic refresh of registration.

Figure 1:
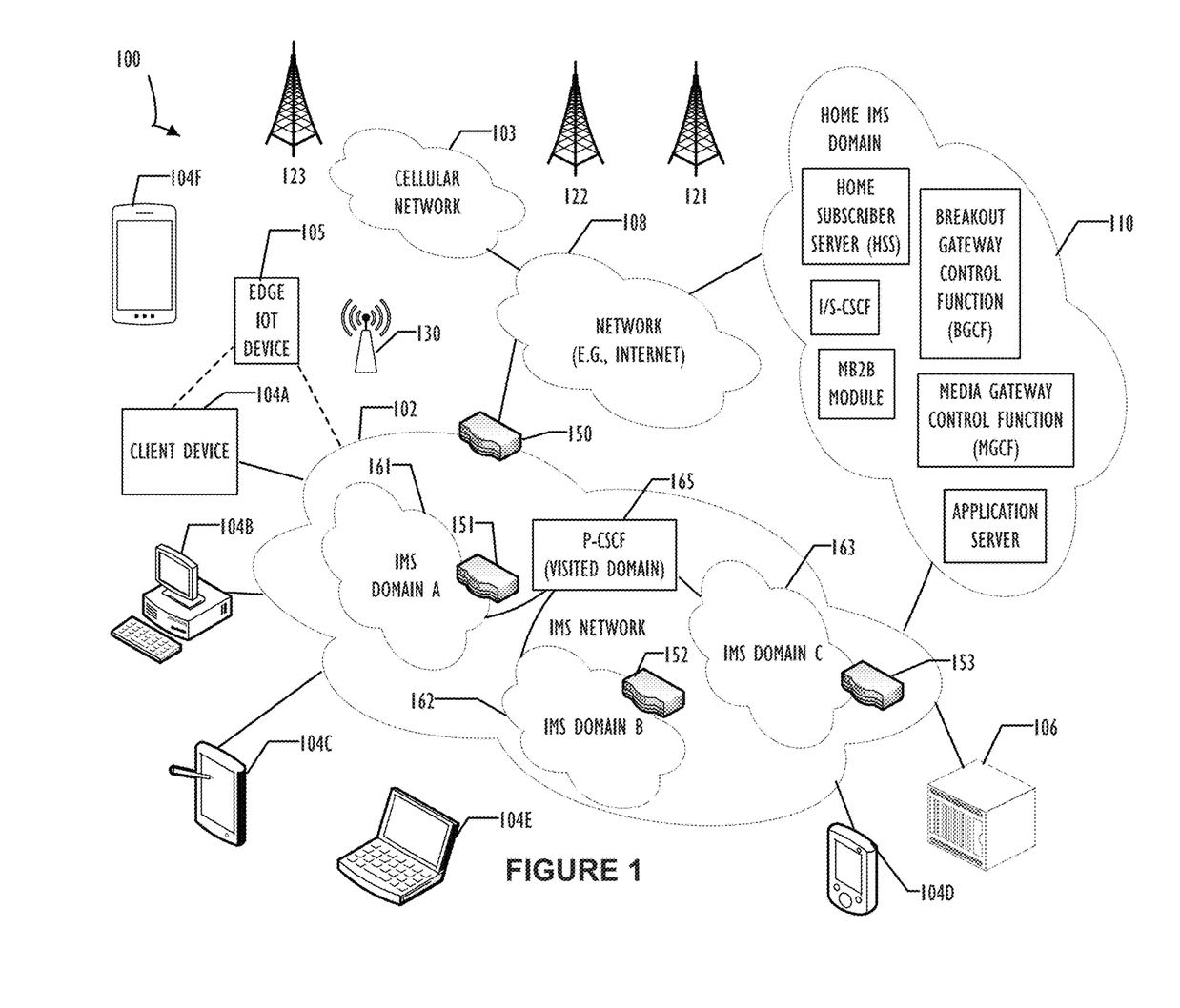
FIG. 1 is a block diagram representing an example of a networked computing and IMS network infrastructure where implementations of the present disclosure may operate.
Figure 3:
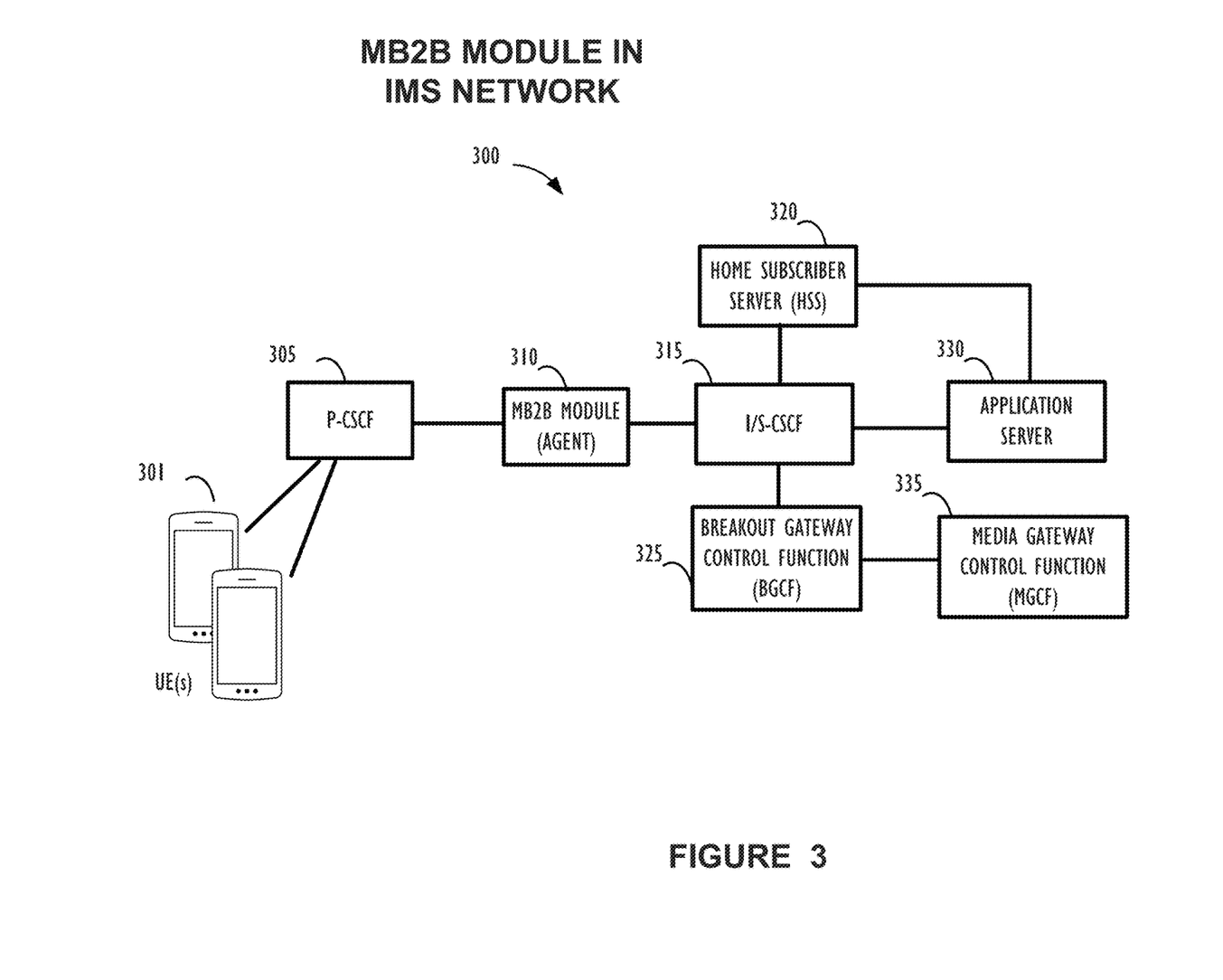
FIG. 3 is block diagram of a multiple back to back module ("MB2B") implementation relative to other components of an IMS network, according to one or more disclosed embodiments.

The proposed solution involves allocating a Network Component referred to as a Multi Back-2-Back Registration ("MB2B") agent deployed in the IMS/VoLTE network between the P-CSCF of the connection domain (which may be a visited domain) and the I-CSCF in the home IMS domain (see FIG. 1 and FIG. 3). In some implementations, the MB2B module may be provided on a dedicated network component or may be configured as an additional software module providing an MB2B capability for an existing component. In either case, the MB2B module may be configured to manage the multi identity (a/k/a "multi-line") registration and de-registration transparently to both UE and network. In short, the MB2B agent, in some implementations, comprises functionality for a) handling session initiation protocol ("SIP") registrations for any additional identity (a/k/a line) on behalf of each subscriber; b) facilitating authentication of each identity in the network, in part, by interfacing with a central repository managing subscriber IMS credentials; c) assisting with any registration re-fresh on behalf of the UE device; and e) handling SIP de-registrations for each additional identity on behalf of the subscriber.

As mentioned above, the disclosed multi-line solution offers functionality where subscribers may be provided with more than one public line/identity ("MSISDN") as additional ID/line(s) concurrently active on a single mobile-device/UE without changing an existing mobile-device/UE. That is, users may be able to take advantage of this improvement in services without having to upgrade the hardware or operating system of their current mobile device. As a result, subscribers may not need to carry more than one mobile device/UE to be able to use multiple line/ID(s) in flexible manner.

In one use case example, a doctor may have three distinct phone numbers. A first number for medical reasons that is answered 24/7 when that doctor is "on-call." A second number, for family members to call, which may be considered a second priority number. And, a third number for personal calls that include general calls or inquiries that may be of lower priority or significance to the doctor than calls directed to either the on-call number or the family number. In this manner, a cell phone could be programmed with different actions based on which number is called and time of day restrictions, for example. Other programming options are available that may leverage the existence of multiple lines on a single mobile UE device.

As a non-limiting example of a programming option made available by the systems of this disclosure, a phone could be configured to ring at any hour when it is a family call, but only ring (or alert) for a personal call number during a pre-defined time period (e.g., 8-5, M-F). In a second example, a phone could be configured to allow only a subset of its associated numbers to "roam" such that when travelling calls on non-roaming numbers will not be delivered to the device. These types of convenience and usability features are not present on a device that has only a single identity (i.e., number) and, if implemented at all, may be implemented based on the number of the caller (e.g., based on caller-id) rather than the number called. As should be apparent, given the benefit of this disclosure, many different capabilities with regard to a user programming their client UE device to perform different actions based on its currently supported multiple identities (phone numbers) may become available that do not exist for a single identity device. For example, a UE device may be configured to ring/alert all the time when a certain high priority number (or numbers) receives an incoming call, and ring/alert only at certain times (e.g., user definable times) when one or more lower priority numbers are called. In another example, location services may be turned on for a first number such that family members may be able to locate the UE device, while determination of the location for a different number of the device may not be made available by a service provider. These are just a few of the many possibilities of a UE device configured based on this disclosure.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system. The term also may be used to refer to a number of such electronic computing devices in electronic communication with one another.

As used herein, the term "medium" refers to one or more non-transitory physical media that together store the contents described as being stored thereon. Examples may include non-volatile secondary storage, read-only memory ("ROM"), and/or random-access memory ("RAM"). Such media may be optical or magnetic.

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code.

Referring now to FIG. 1, networked computing infrastructure 100 is illustrated in a block diagram and represents an example in which implementations of the present disclosure may operate. The relative locations of components in computing infrastructure 100 is not intended to be limiting. In fact, components shown in one area such as IMS Network 102 may exist separately as opposed to grouped together as shown. In some examples, an IMS network/domain can be considered to represent an IP multimedia subsystem or multiple subsystems. Each different IMS network domain can be considered a subsystem that would likely have its own dedicated connection to network 108 but are shown grouped as a single IMS network for simplicity of the figure. Each of the devices shown in computing infrastructure 100 may be moved around unless explicitly disposed in a specific logical or physical location as described herein. Specifically, the MB2B module is expected to be logically between the P-CSCF 165 and other devices of Home IMS domain 110 as illustrated and discussed with FIG. 3 below.

In the example of FIG. 1, network devices such as switches, routers, gateways, and wireless access points may support an IMS network and additional networks to provide a multi-line UE device capability in accordance with this disclosure. Networked computing infrastructure 100 comprises an IMS network 102, network 108 (e.g., the Internet), a cellular network 103, and a "backend" Home domain IMS network 110 including multiple network components or capabilities. In one example, IMS network 102 includes multiple IMS domains 161, 162, and 163, that may be geographically disperse from each other or more overlap in geographic area supported.

Figure 5A:
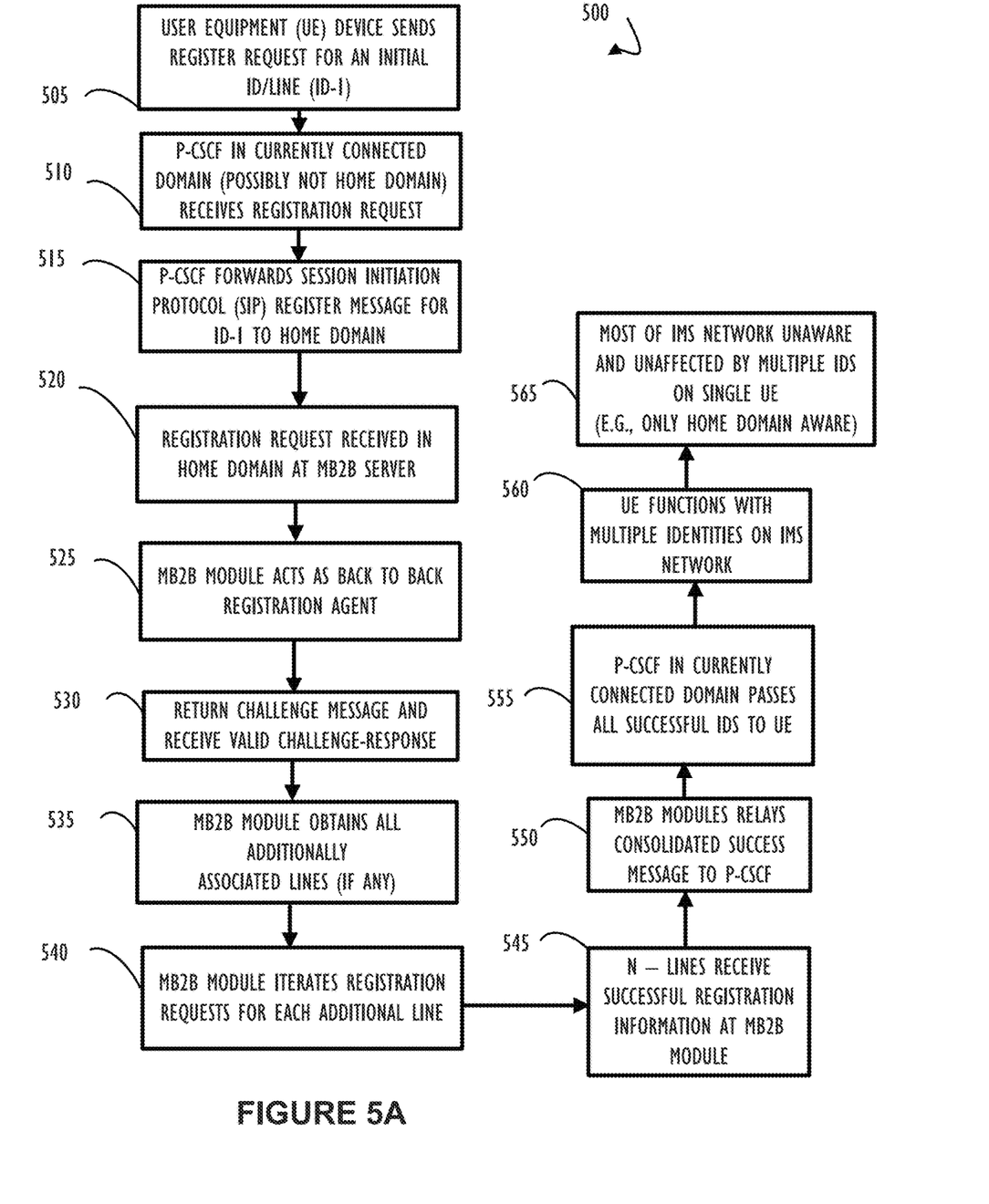
FIGS. 5A-B are flow charts of example processes representing two possible methods of network registration using a MB2B module, according to one or more disclosed implementations.
Figure 5B:
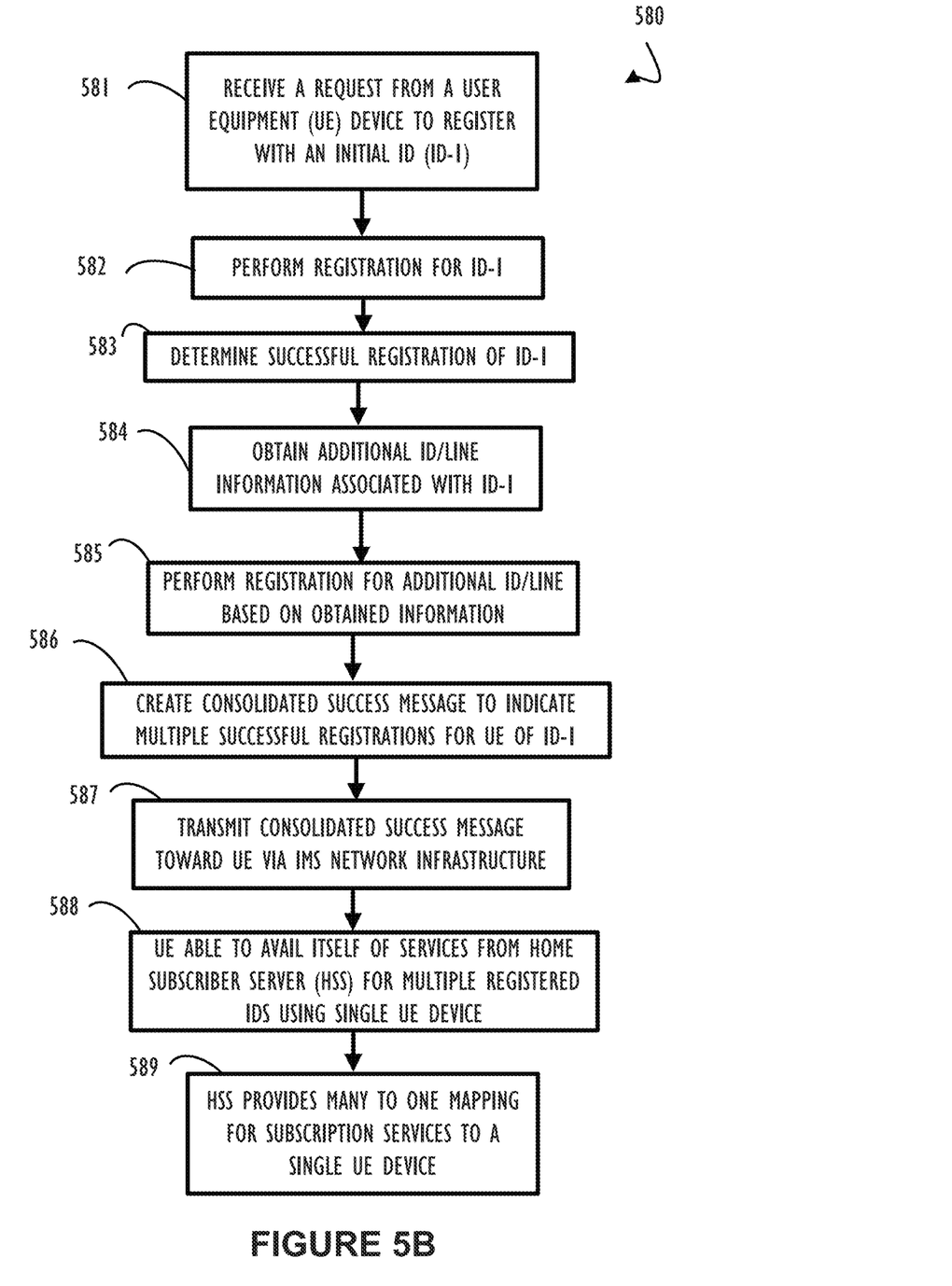

Each IMS domain may further include a local private network, such as local area network ("LAN") that includes a variety of network devices that include, but are not limited to switches 150, 151, 152, and 153), servers, wireless access points ("WAPs") 130, and routers. Each of these networks can contain wired or wireless programmable devices and operate using any number of network protocols (e.g., TCP/IP or Session Initiation Protocol (SIP)) and connection technologies (e.g., WiFi® networks, Bluetooth®). SIP is a common protocol for use in IMS networks and a registration process based on SIP is used as an example as explained in FIG. 5 below.

In this example, IMS network 102 includes multiple sub-networks that each represent IMS domains of a service provider (e.g., IMS domain A 161, IMS domain B 162, and IMS domain C 153). Computer infrastructure 100 may also include, virtual networks, data centers, and/or other remote networks (not shown). Because of the complexity of network configuration, the example of FIG. 1 should be considered a logical representation of the network as opposed to a strictly physical connectivity diagram.

As shown in FIG. 1, IMS network 102 may be connected to one or more client devices and/or UE devices 104A-F and other networks (e.g., cellular network 103, public network 108, and Home IMS domain 110). This connectivity may be used to allow the client devices to communicate with each other and/or with backend cloud or server resources in addition to Home IMS domain 110 (e.g., via network 108). Client devices 104A-F may be computing systems such as desktop computer 104B, tablet computer 104C, mobile phone 104D, laptop computer 104E (shown as wireless), UE device 104F, and/or other types of computing systems generically shown as client device 104A. Networked computing infrastructure 100 may also include other types of devices generally referred to as Internet of Things ("IoT") (e.g., edge IOT device 105) that may be configured to send and receive information via a network to access network services or interact with a remote web browser application (e.g., to receive information).

FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between IMS network 102 and other networks such as network 108 and Home IMS domain 110. Local compute resource 106 may also facilitate communication between other external applications, data sources, and services, and IMS network 102. Although shown outside of each IMS Domain A-C, it is likely that each IMS domain will include at least one local compute resource 106.

Networked computing infrastructure 100 also includes cellular network 103 for use with mobile communication devices. Mobile cellular networks support mobile phones and many other types of UE devices such as laptops etc. Mobile devices in networked computing infrastructure 100 are illustrated as mobile phones 104D and 104F, laptop 104E, and tablet 104C. A UE device such as mobile phones 104D or 104F may interact with one or more mobile provider networks (e.g., IMS domains A-C) as the mobile device moves, typically interacting with a plurality of mobile network towers 121, 122, and 123 for connecting to the cellular network 103. Although referred to as a cellular network in FIG. 1, a mobile device may interact with towers of more than one provider network, as well as with multiple non-cellular devices, such as wireless access point 130, and routers (e.g., local compute resource 106). In addition, the mobile UE devices may interact with other mobile devices or with non-mobile devices such as desktop computer 104B and various types of client devices 104A for desired services. In particular, a UE device may utilize service provided, via IMS network 102, that originate or are supported on computers within Home IMS domain 110 (e.g., the disclosed MB2B module).

As illustrated in FIG. 1, IMS network 102 may also include a dedicated network device 150 (e.g., gateway or router) or a combination of network devices 150, 151, 152, and 153, that implement a connectivity path for each IMS subdomain to interact with external networks. Note that network device 150 may provide one or more of these capabilities for network 102, while network devices 151, 152, and 153 may provide one or more of these capabilities for their respective IMS domains (161, 162, and 163). Of course, one or more network devices may work together to provide specific connectivity and security requirements for different portions (e.g., subnets or subdomains) of a network.

FIG. 1 illustrates that IMS network 102 is coupled to a network 108. Network 108 may include one or more computing networks available today, such as other LANs, wide area networks ("WANs"), the Internet, and/or other remote networks, in order to transfer data between client devices 104A-F and other backend cloud or server resources (e.g., Home IMS domain 110). Each of the computing networks within network 108 may contain wired and/or wireless programmable devices that operate in the electrical and/or optical domain. For example, network 108 may include wireless networks, such as cellular networks in addition to cellular network 103.

Wireless networks may utilize a variety of protocols and communication techniques, including but not limited to, Long Term Evolution ("LTE") networks, Global System for Mobile Communications ("GSM") based cellular networks, wireless fidelity WiFi networks, Bluetooth, Near Field Communication ("NFC"), and/or other suitable radio-based networks as would be appreciated by one of ordinary skill in the art upon viewing this disclosure. Network 108 may also employ any number of network communication protocols, such as Transmission Control Protocol ("TCP") and Internet Protocol ("IP"). Although not explicitly shown in FIG. 1, network 108 may include a variety of network devices, such as servers, routers, network switches, and/or other network hardware devices configured to transport data over networks.

In FIG. 1, Home IMS domain 110 is illustrated as a remote network that is able to communicate with client devices 104A-F via IMS network 102 and network 108. However, it is possible that client devices 104A-F may initially connect to an IMS domain that is the same as their Home IMS domain. For example, if using their device in an area covered by their service provider. In this case, a UE device may not need to be connected using all the intervening networks shown in FIG. 1. This may be conceptually thought of as having element 110 of FIG. 1 "inside" of one of IMS domains A 161, B 162, or C 153. However, when travelling remotely from an area covered by their service provider that same user (and their associated UE device) may request registration and connection using a computer infrastructure as shown, to remotely connect with Home IMS domain 110.

Figure 2:
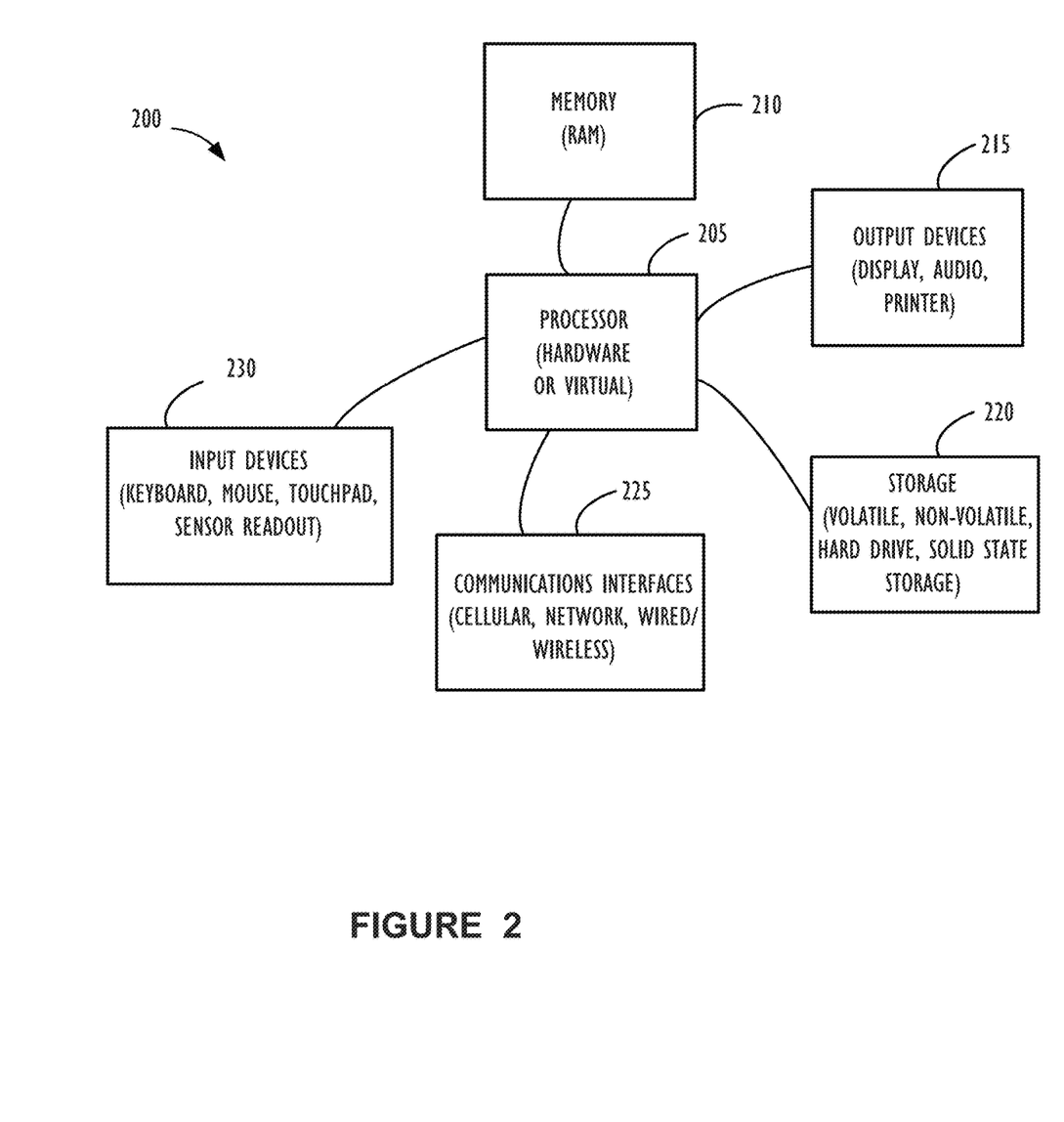
FIG. 2 is high-level block diagram of a computing device that may be included in one or more of the components shown in FIG. 1 and FIG. 3 to allow them to be configured to perform one or more disclosed methods or processes.

FIG. 2 illustrates a high-level block diagram of a computing device 200 (e.g., computing system or network device as shown in FIG. 1) that may be used to implement one or more disclosed examples (e.g., a UE device, a component shown as part of a communication path, and the network devices attached to the network, including a device configured with the disclosed MB2B module). For example, computing device 200, illustrated in FIG. 2, could represent a client device or a physical server device from network infrastructure 100 and could include either hardware or virtual processor(s) depending on the level of abstraction of the computing device. In some instances (without abstraction) computing device 200 and its elements as shown in FIG. 2 each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware.

As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication ("PLC"), W-Fi, cellular, and/or other communication methods.

As illustrated in FIG. 2, computing device 200 includes a processing element, such as processor 205, that contains one or more hardware processors, where each hardware processor may have a single or multiple processor cores. In one example, processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 ("L3"), level 4 ("L4"), or other levels of cache, a last level cache ("LLC"), or combinations thereof. Examples of processors include but are not limited to a central processing unit ("CPU") microprocessor. Although not illustrated in FIG. 2, the processing elements that make up processor 205 may also include one or more other types of hardware processing components, such as graphics processing units ("GPUs"), application specific integrated circuits ("ASICs"), field-programmable gate arrays ("FPGAs"), and/or digital signal processors ("DSPs").

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random-access memory ("RAM"), can be any suitable non-permanent storage device. The non-volatile storage devices 220 can include one or more disk drives, optical drives, solid-state drives ("SSDs"), tap drives, flash memory, read-only memory ("ROM"), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 200 may comprise other components well known in the art, such as sensors, powers sources, and/or analog-to-digital converters, not explicitly shown in FIG. 2.

As mentioned above, the disclosed MB2B module represents an improvement to the art of cellular network use, configuration, and administration by providing an interface to support multi-line capability of individual UE devices. A server configured with MB2B capabilities may assist in registration and track information for billing purposes for a cellular (or other network) service provider. Additionally, MB2B module can be plugged in an existing IMS network with minimal impact as it may be configured to transparently handle each of multiple identity registrations for a single UE on a backend server (e.g., network component).

The disclosed approach provides benefits, including: offloading Network registration complexity from a possible multi-line mobile soft client; portability across mobile soft clients; transparent use on a SIP network; limited configuration changes to other network device (may employ limited initial reconfiguration of P-CSCF network component); limited potentially sensitive multi-line information, such as IMS credentials, may be exposed to the end-user/multiline mobile soft client (only initial ID is disclosed on the UE device, other IDs may be concealed by the server side functionality); and reduced network load, in part, because network registration request and response messages may be only between a MB2B registration agent and the I-CSCF or S-CSCF, instead of in between the UE and I/S-CSCF.

Referring now to FIG. 3, block diagram 300 illustrates multiple network components that provide support for a IMS network service provider and include the disclosed MB2B module. Different functional components of FIG. 3 may be implemented together on a single network component or distributed across several network components as per design implementation details. Further, some service providers may have more than one of each of these functional components executing in one or more IMS domains to provide support for their subscribers. IMS domains exist throughout the world wherever cellular phone service is available.

Several roles of SIP servers or proxies, collectively called Call Session Control Function ("CSCF"), may be used to process SIP signaling packets in the IMS infrastructure. A Proxy-CSCF ("P-CSCF") 305 refers to a SIP proxy that is the first point of contact for the IMS terminal executing a SIP User Agent (e.g., where a UE 301 device connects to the IMS network). The P-CSCF 305 handles requests from the UE and is, from the UE's point of view, the "SIP proxy" to the entire subsystem (via the I-CSCF and/or S-CSCF) 315. It may include a Policy Control Function ("PCF") responsible for enforcing QoS policies on media. In terms of policy-based networking outlined in RFC 27535, the PCF is the policy server, or Policy Decision Point ("PDP"). This is separate from the Policy and Charging Rules Function ("PCRF"), which enforces policy on the transport network.

Logically, the P-CSCF 305 is considered part of the visited network as illustrated in FIG. 1 element 165. An I/S-CSCF 315 refers to a network component performing one or both of the roles of a "servicing" CSCF (i.e., S-CSCF) or an interrogating CSCF (i.e., I-CSCF). The S-CSCF is a SIP server logically seen as part of the home network and is analogous to the Home Location Register ("HLR") used in GSM. It "knows" about the user, what applications are available to the user, and represents a decision point as to whether the user's SIP messages will be forwarded to the application server(s) 310. The S-CSCF may also store addresses used for contacting the UE 301, so that each address can be used in future sessions. The S-CSCF may also represent the enforcement point of the network operator's (e.g., service provider's) policies. The I-CSCF is the entity that initiates the assignment of a user to an S-CSCF (usually by querying the HSS 320) during registration. The I-CSCF is "seen" by the IMS core as a proxy to an individual user and is a liaison for SIP messaging between the user (via the P-CSCF) and the S-CSCF.

The HSS 320 may include a database or other type of datastore that maintains user profile and location information and is typically responsible for name to address resolution. HSS 320 may also be responsible for authentication and authorization, but unlike in legacy technologies, authentication with the radio access network and the core can be different. Further, in disclosed embodiments, a MB2B module (agent) 310 may also be involved in registration and therefore the authentication process. The MGCF 335 controls media gateways ("MGWs"), performs transcoding (converting codecs, for example from one encoding to another) and the conversion of media between the Real-time Transport Protocol ("RTP") used in IMS and the Pulse Coded Modulation ("PCM") used by a circuit-switched network. The MGCF 335 may also serve as the breakout to a circuit-switched network. In that case the MGCF 335 is also responsible for managing the conversion of signaling messages, converting SIP messaging to the Bearer Independent Call Control ("BICC") and ISDN User Part ("ISUP") protocols used in legacy systems. If an MGCF 335 does not include the breakout to a circuit-switched network, that functionality is performed by the BGCF 325. When the BGCF 325 does control this breakout, it may do so, for example, by selecting an MGCF 325 (either in the same IMS network or another IMS network) or by selecting an MGW (on a non-IMS-based network).

A MB2B module 310 represents a module configured to support multi-line capability on an existing IMS terminal such as UE 301 in accordance with the example implementations of this disclosure. FIG. 3, shows a logical network diagram depicting positioning of MB2B module 310 in IMS network 300. For example, the MB2B module 310 is configured to perform its function between the P-CSCF 305 and the I/S-CSCF 315. In some implementations, when a UE 301 is associated with multiple identities as defined in the HSS 320, the registration of that UE 301 is performed multiple times between the MB2B module 310 and the I/S-CSCF 315. From the perspective of the I/S-CSCF 315 it may appear as if multiple lines/phone-numbers, each with a unique identity, are sequentially registering with the IMS network 300. Logically, MB2B module 310 may be considered as a multiplexer/router to assist a single line registration result in multiple line registrations for a single UE connected to the network. As a result, a single UE device 301 may support multiple identities and line numbers.

Figure 4:
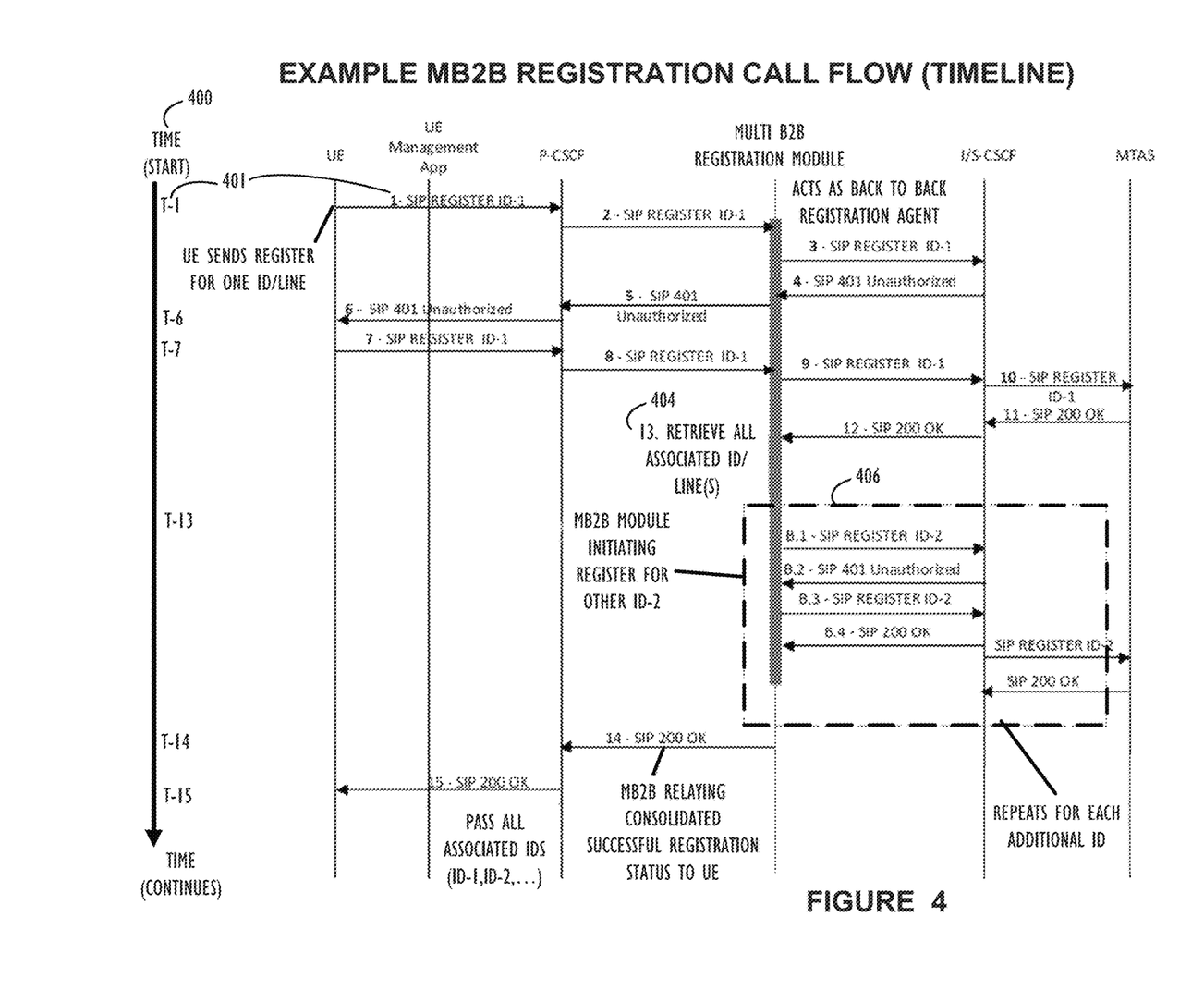
FIG. 4 illustrates a timeline of an example MB2B module performing a multi-line registration of a UE device, according to one or more disclosed implementations.

Referring now to FIG. 4, an example SIP registration timeline for UE device ID-1, beginning at Time (start) 400 is illustrated. Each event in the timeline example is numbered and corresponds to a sequential event number as illustrated by T-1 and event number 1 arrow referenced by element 401. Beginning at time T-1, event 1 indicates that a UE device ID-1 uses a UE management application (e.g., a soft client) to send an SIP registration request to a P-CSCF. As explained above, the P-CSCF may be considered the initial point of contact for any UE device attempting to register to an IMS network and may be a component logically positioned in a visited IMS domain (rather than a subscriber's home domain). Event 2 occurs sequentially after event 1 and indicates that the SIP registration message for ID-1 is forwarded to an MB2B module (e.g., element 310 of FIG. 3).

The MB2B module may contact the HSS or access some other datastore associated with the Home IMS domain to determine if this is a multi-identity device, for example by checking a service account associated with ID-1. The MB2B module may then forward the initial registration request as event 3 to the I/S-CSCF (e.g., element 315 of FIG. 3). In this example, it is determined that authorization fails for one of many possible reasons (including the challenge/response authentication method of IMS authentication) and an unauthorized response is shown as originating at the I/S-CSCF and arriving at the MB2B module. Event 5 indicates that the MB2B module forwards the failure message (possibly with some additional processing) to the P-CSCF which in turn sends the failure message to the UE device at event 6. Thus, events 1-6 of this example timeline illustrate a single identity registration failure (i.e., challenge) for ID-1.

Next, at time T-7, which could be a substantially later time than T-6 a SIP registration request is initiated with an ID-1 from a UE device. Note that may represent the "response" portion of the challenge/response authentication method of an IMS network. In T1-6, the attempts to connect was first made without authentication and the IMS network rejects (i.e., challenges) the registration. Starting at time T-7, the UE re-attempts ID-1 registration with authentication information. In event 8 the registration request is forwarded to the MB2B module which then initiates event 9 by forwarding the registration request to the I/S-CSCF. As in the example above, the MB2B module may have determined if this ID-1 account is associated with a multi-line account. When this determination is made may be implementation specific. For example, it may be made as part of an initial registration request (e.g., before successful registration as a result of event 9) or only after at least one successful registration (e.g., result of event 12). Event 10 indicates that the I/S-CSCF passed its initial registration and a registration message is further processed by an application server 330 and returned to the MB2B modules by events 11 and 12.

At time T-13, in this implementation, the MB2B module determines that ID-1 is associated with multiple IDs/lines and that information is retrieved. For example, retrieved from an HSS or other system that is part of or accessible from the subscriber's Home IMS domain. Block 406 outlines a series of events that may occur in response to the MB2B module determining that a second line is associated with the device of ID-1. In this example, events inside block 406 represent a repeated subset of registration requests repeated for each additional identity associated (e.g., as determined from a subscriber database) with the initial UE device (e.g., ID-2, ID-3, etc.)). After looping through all associated ID-s for this device, we exit block 406 with event 14 which is a response message to relay registration status to the UE device. Prior to transmitting the message in event 14 (e.g., at the end of block 406, the MB2B module may be configured to create a consolidated registration status regarding all successfully registered identities and send that to the UE device. Alternatively, a successful message may only be sent to the UE device if all applicable identities have been successfully registered. Event 15 indicates that the P-CSCF forward the registration complete message to the UE device at time T-15. Note, that a similar loop may be employed by an MB2B module to perform a refresh of registration for the UE device.

This paragraph briefly describes an example authentication/connection procedure for a UE device to obtain services from the IMS network and may be considered the typical authentication process for purposes of this disclosure. For example, as mentioned above, the typical authentication procedure has at least two parts (e.g., challenge/response) and may be considered a mutual authentication in that the UE authenticates the network and the network authenticates the UE. In this example of a typical IMS registration process, the UE authenticates itself in the IMS network to be able to access any service. This is done during a registration process in which the UE sends its IMPI in an initial REGISTER message to the S-CSCF which contacts the HSS for authentication. The HSS uses the IMPI to calculate the authentication vectors (RAND, AUTN, XRES, CK, IK) and passes them back to the S-CSCF. Next, the S-CSCF challenges UE to authenticate itself by passing just RAND and AUTN in a 401 Unauthorized response message. Essentially, at this stage the IMS network is requesting the UE to use its security algorithms. Because the UE device may be using the same private key as the one in its corresponding HSS, when the UE executes its security algorithms on the received RAND it shall generate the same AUTN that was received in 401-challenge response. If the value of the received and generated AUTN match, the UE has confirmed to itself that the IMS network is legitimate (UE authentication of network is achieved). After the UE is assured the IMS network is legitimate, the UE will generate, using its internal security algorithms, its RES (based on the received RAND). It can then send back to the HSS this RES result in the ensuing REGISTER message. If this RES received from the UE device at the HSS matches with an XRES originally computed by HSS for this line (IMPI), then the UE is considered legitimate (network authentication of UE is achieved) and the registration process proceeds. Thus, you have the UE device first determining that the network is valid for connection and then the infrastructure of the network (including the Home domain) determining that the device is valid for connection.

Referring now to FIG. 5A, process 500 is illustrated in flow chart form and represents one possible method of performing a multi-line registration for a single UE device (i.e., terminal endpoint in IMS), according to one or more disclosed implementations. Beginning at block 505, a UE device sends a register request for an individual ID/line such as ID-1. Block 510 indicates that a P-CSCF in the currently connected domain, which may be a visited domain, receives the registration request. Block 515 indicates that the P-CSCF forwards a SIP registration request for ID-1 to the Home IMS domain.

Block 520 indicates that the registration request is received at the MB2B server of the Home IMS domain. Block 525 indicates that the MB2B module may act as a back to back registration agent for the ID-1 request. Block 530 indicates that the challenge/response process described above may be performed for the UE device using ID-1. Upon success of an initial registration for ID-1, block 535 indicates that the MB2B module may obtain all additionally associated lines for ID-1. Block 540 indicates that the MB2B module may iterate (as described above in FIG. 4) through a set of registrations (one for each additional identity) as part of servicing the ID-1 registration request. Block 545 indicates that some number "N" lines are successfully registered as a result of the multiple requests performed by the MB2B module. Block 550 indicates that the MB2B module may create a consolidated success message and relay that back to the appropriate P-CSCF.

Block 555 indicates that the appropriate P-CSCF is the P-CSCF of the currently connected domain and, upon receipt of this message from the MB2B module, passes the message onto the UE device. Block 560 indicates that the device associated with ID-1 (and the initial single registration request) is now able to function on the IMS network with multiple identities routed to the single device. Block 565 indicates that this process and the continued multi-line connection of the UE device may take place with only the subscriber's home domain being aware that the single device is associated with the multiple identities.

Referring now to FIG. 5B, process 580 is illustrated in flow chart form and represents a second possible method of performing a multi-line registration for a single UE device (i.e., terminal endpoint in IMS), according to one or more disclosed implementations. Beginning at block 581, a registration request is received from a UE device for ID-1. Block 582 indicates that registration is performed for ID-1 in the subscriber's home IMS domain. Block 583 indicates that a successful registration for ID-1 has occurred. Block 584 indicates that additional lines may be obtained that are associated with ID-1. Block 585 indicates that an MB2B module may perform additional registrations as appropriate. Block 586 indicates that a consolidated message indicating success of multiple registrations may be created. For example, by the MB2B module. Block 587 indicates that the consolidated message may be transmitted via the IMS network toward the UE device. Block 588 indicates that the UE is now able to utilize services from the HSS for multiple lines on a single device. Block 589 indicates that the HSS (e.g., MB2B module of HSS) provides a many to one mapping of subscription services (i.e., for multiple lines) to a single UE device.

Those skilled in the art having the benefit of this disclosure will recognize that the MB2B module 310, shown in FIG. 3, will typically be implemented in software. The software will reside as executable instructions on some form non-transitory medium such as the storage 220 in FIG. 2. When executed by a processor (e.g., the processor 205 in FIG. 2), the software performs the functionality recited in the claims below, of which FIG. 4, FIG. 5A, and FIG. 5B provide examples. This software may be, for example, an application, or some kind daemon, or some other kind of software. However, in alternative embodiments, this functionality may be implemented in hardware, such as a programmed Application Specific Integrated Circuit. Or, in still other alternative embodiment, it may be a combination of hardware and software.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of registering a single user equipment (UE) device with multiple identities on an Internet protocol multimedia system (IMS) network, the method comprising:
   receiving a registration request, via a communications network, from the UE device, the registration request associated with a first identity;
   performing a first registration of the first identity with the IMS network;
   determining success of the first registration request;
   obtaining at least one additional identity, that is associated with the first identity, from a data repository associated with a home IMS domain, the home IMS domain identified in the IMS network as associated with the first identity;
   performing a second registration for the at least one additional identity with the IMS network;
   creating a response message indicating a success status of the first registration and the second registration;
   transmitting the response message toward the UE device via the communications network; and
   facilitating a use of the UE device as associated with the first identity and the at least one additional identity concurrently on the IMS network, wherein facilitating the use of the UE device comprises allowing the UE device to receive calls from a plurality of phone numbers, each of the plurality associated with a single one of multiple identities concurrently on the IMS network.

2. The method of claim 1, wherein the at least one additional identity comprises two additional identities such that the UE device is concurrently associated with three identities.

3. The method of claim 2, wherein the three identities are associated with a first line phone number representing a high priority number, a second line phone number representing a medium priority number, and a third line phone number representing a low priority number with each of the first, second, and third line phone numbers being different from each other.

4. The method of claim 1, wherein the IMS network represents a subset of the communications network.

5. The method of claim 1, wherein the first registration and second registration are performed by a multi back to back (MB2B) module logically positioned between a proxy call session control function (P-CSCF) and an interrogating and/or servicing call session control function (I/S-CSCF) of the IMS network.

6. The method of claim 5, wherein the P-CSCF is in a different IMS domain than the I/S-CSCF.

7. The method of claim 6, wherein the P-CSCF is located in a visited IMS domain and each of the MB2B module and I/S-CSCF are located in a home IMS domain with a Home Subscriber Server (HSS).

8. The method of claim 1, wherein first registration request and the second registration request are each session initiation protocol (SIP) registration requests.

9. A non-transitory computer readable medium comprising computer executable instructions stored thereon, that when executed by one or more processing units, cause the one or more processing units to perform a method of providing a multiline capability for a single user equipment (UE) device in an Internet protocol multimedia system (IMS) network, wherein the non-transitory computer readable medium is used to configure an existing component of the IMS network to provide MB2B functionality, the method comprising:

receiving a registration request, via a communications network, from the UE device, the registration request associated with a first identity;
performing a first registration of the first identity with the IMS network;
determining success of the first registration request;
obtaining at least one additional identity, that is associated with the first identity, from a data repository associated with a home IMS domain, the home IMS domain identified in the IMS network as associated with the first identity;
performing a second registration for the at least one additional identity with the IMS network;
creating a response message indicating a success status of the first registration and the second registration;
transmitting the response message toward the UE device via the communications network; and
facilitating a use of the UE device as associated with the first identity and the at least one additional identity concurrently on the IMS network.

10. The non-transitory computer readable medium of claim 9, wherein the at least one additional identity comprises two additional identities such that the UE device is associated with three identities concurrently.

11. The non-transitory computer readable medium of claim 9, wherein facilitating the use of the UE device comprises allowing the UE device to receive calls from a plurality of phone numbers, each of the plurality of phone numbers associated with a single one of multiple identities concurrently on the IMS network.

12. A computer system, comprising:
a network communications interface;
a memory; and
one or more processing units, communicatively coupled to the memory and the network communications interface, wherein the memory stores instructions, that when executed by the one or more processing units, cause the one or more processing units to provide a multi back to back (MB2B) function to support multi-line capability on a single user equipment (UE) device of an Internet protocol multimedia system (IMS) network, the MB2B function configured to:
receive a registration request, via a communications network, from the UE device, the registration request associated with a first identity;
perform a first registration of the first identity with the IMS network;
determine success of the first registration request;
obtain at least one additional identity, that is associated with the first identity, from a data repository associated with a home IMS domain, the home IMS domain identified in the IMS network as associated with the first identity;
perform a second registration for the at least one additional identity with the IMS network, wherein the first registration and second registration are performed by a multi back to back (MB2B) module logically positioned between a proxy call session control function (P-CSCF) and an interrogating and/or servicing call session control function (I/S-CSCF) of the IMS network the P-CSCF being in a different IMS domain than the I/S-CSCF;
create a response message indicating a success status of the first registration and the second registration;
transmit the response message toward the UE device via the communications network; and
facilitate a use of the UE device as associated with the first identity and the at least one additional identity concurrently on the IMS network.

13. The computer system of claim 12, wherein the at least one additional identity comprises two additional identities such that the UE device is associated with three identities concurrently.

14. The computer system of claim 13, wherein the three identities are associated with a first line phone number representing a high priority number, a second line phone number representing a medium priority number, and a third line phone number representing a low priority number with each of the first, second, and third line phone numbers being different from each other.

15. The computer system of claim 12, wherein the IMS network represents a subset of the communications network.

16. The computer system of claim 12, wherein the P-CSCF is located in a visited IMS domain and each of the MB2B module and I/S-CSCF are located in a home IMS domain with a Home Subscriber Server (HSS).

* * * * *